Patented Apr. 17, 1945

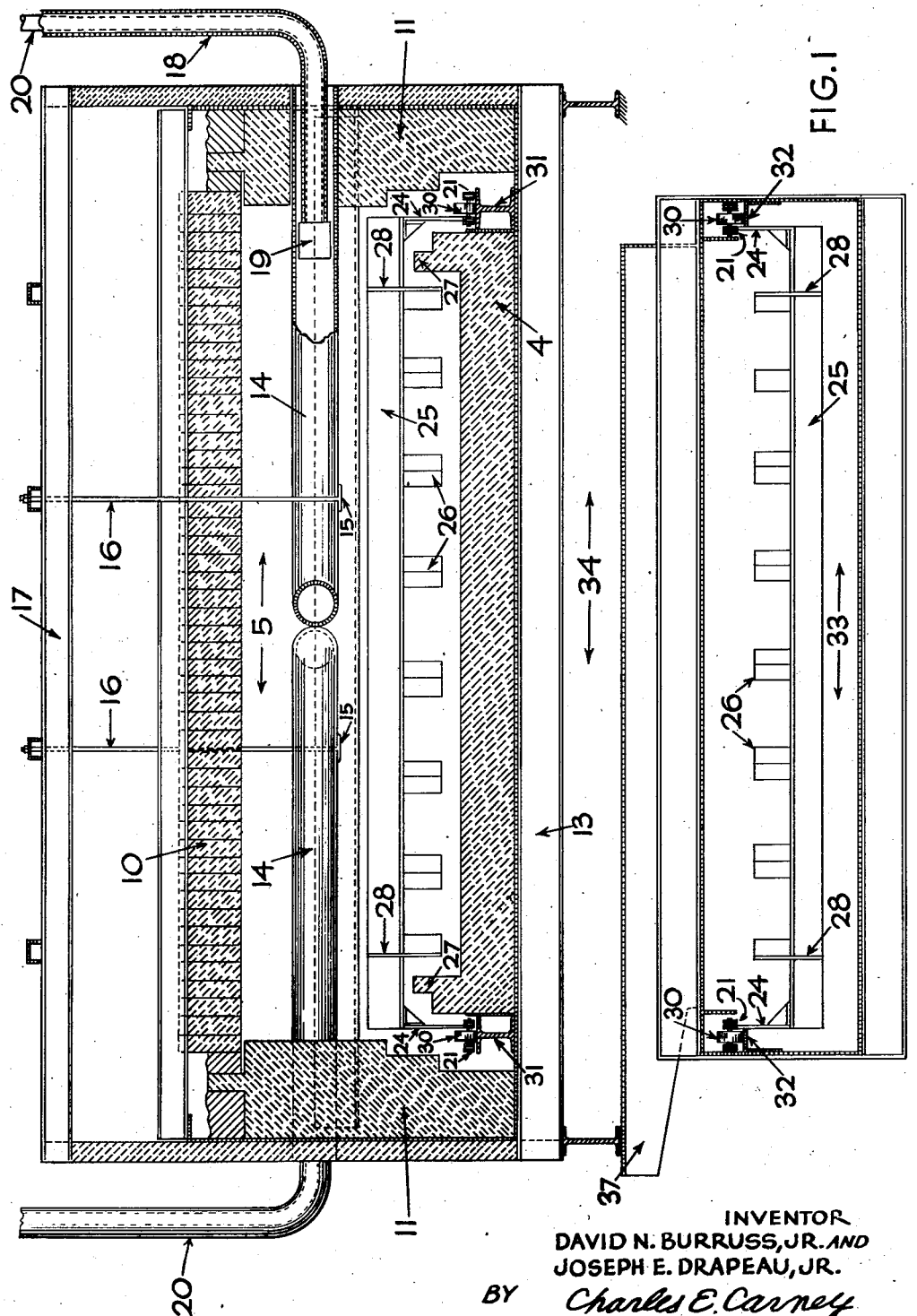

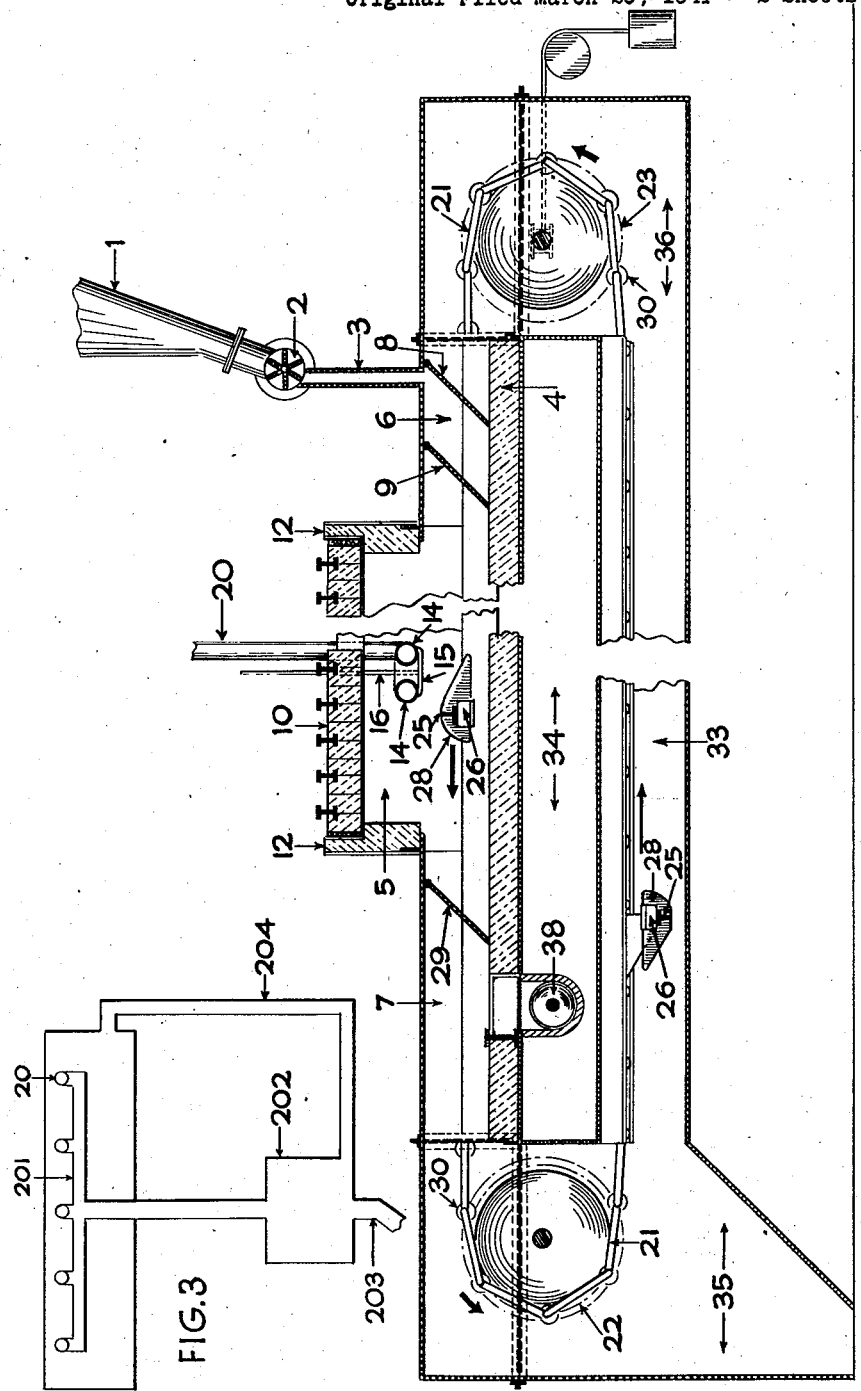

2,373,657

UNITED STATES PATENT OFFICE 2,373,657

REDUCING METHOD

David N. Burruss, Jr., Hammond, Ind., and Joseph E. Drapeau, Jr., Calumet City, Ill., assignors to The Glidden Company, Cleveland, Ohio, a corporation of Ohio Original application March 29, 1941, Serial No. 385,782. Divided and this application September 1, 1942, Serial No. 456,906

7 Claims. (Cl. 75—34)

The present invention relates to the art of reduction of metal oxides and particularly relates to a method for producing metal powders or sponge, such as copper and iron powders or sponge by reduction from oxides.

The invention has for its main object the production of metal sponge or powder by improved methods whereby the sponge or powder may be continuously produced.

Apparatus and methods for the continuous production of sponge iron and iron powder have been proposed heretofore, but these have not been commercially successful due to mechanical difficulties which develop after the operation has run a short while. As a result the only commercial source of sponge iron has been that produced from high grade Swedish ore produced by a batch process, which is not only time consuming but technically inefficient.

It is accordingly a special object of the present invention to provide a process suitable for continuously producing sponge iron and iron powder which is substantially free from the inherent development of mechanical difficulties after relatively short periods of operation.

In order that the invention may be clearly understood it will be more fully described with reference to the accompanying drawings in which:

Figure I is a transverse cross section of the furnace.

Figure II is a broken longitudinal cross section of the furnace.

Figure III is a diagrammatic drawing of a modification.

Referring to the drawings: 1 represents a hopper for storing the charge. A feed device 2 is provided for regulating the rate at which the charge is fed through conduit 3 onto the stationary hearth 4, forming the bottom of the reducing chamber 5, and which extends into the preheating zone 6 at the feed end and into a discharging zone 7 at the discharge end of the furnace. Doors 8 and 9 are provided, one on each side of the discharge end of conduit 3, which are hingedly mounted at their upper ends and so arranged to rest upon the hearth 4, or upon the charge thereon, when in closed position and so mounted to be raised by means mounted on the conveying mechanism, to be described, and to fall back in closed position by gravity.

The reducing chamber 5 is provided with a heat insulated top 10, heat insulated side walls 11, and heat insulated end portions 12. The hearth which forms the bottom of the reducing chamber is composed of a refractory heat conducting material such as high heat conductivity brick. The hearth is supported directly upon the structural supporting members 13 of the furnace, so that it is exposed to direct heat radiation to the atmosphere. By this arrangement the hearth is maintained relatively cool and thereby aids in preventing sintering of the charge.

Members 14 are U shaped gas, fired radiant combustion tubes, and are supported in the reducing chamber 5 by means of cradles 15, which are in turn supported by rods 16 carried by the superstructure 17. A combustible mixture of gas is introduced through inlet 18, burnt in burner 19 located in one arm of the U tube 14, and the burnt gases after passing through the combustion tube are exhausted through exhaust 20. In the form shown each combustion tube extends half way into the furnace from the sides, and they are alternately arranged on each side of the furnace. The combustion tubes are of such capacity and are provided in sufficient number to produce the necessary temperature, and other arrangements of the tubes as well as other suitable heating means may be produced.

The conveying means comprises two endless link chains 21 carried by drive sprockets 22 and tail sprockets 23. Attached at intervals to the chains 21 are plates 24, upon which are slidably mounted the rabble arms 25. Attached at intervals to the rabble arms 25 are rabbles 26 for rabbling the charge and for advancing it through the reducing chamber. These plows are of two kinds, the center ones are V shaped, while the side plows of each group are half-V-shaped and are inclined to the direction of travel so as to force the charge away from the baffles 27. The rabbles are spaced across the rabble arms 25 and so mounted that they plow furrows in the charge, the rabbles on successive bars being placed so as to plow through the elevations formed in the charge by the preceding plows. The shape of the rabbles, their speed of travel and their number are such that the charge is conveyed and agitated at a proper rate to effect the reduction of the charge and to prevent local overheating with its danger of sintering. Also mounted upon the rabble arms 25 adjacent the end plows are gate opening means 28. As these gate opening means come into contact with gates 8 and 9 as well as gate 29 in the discharge zone 7, the gates are raised to permit passage of the plows and their associated supporting elements. The plates 24 are fastened to the links of the chain in any suitable manner, or may constitute links of the chain. Baffles 27 protect the chain from direct radiation while traveling through the reducing chamber.

The rabbles and the rabble supporting elements, however, are necessarily exposed to the full heat of the reducing chamber and means are provided for adequately cooling these elements to prevent sintering brought about by overheating of these elements with the resultant mechanical difficulties. When sintering occurs due to overheating of the rabbling means, the operation of the conveying mechanism is interfered with and other mechanical difficulties are encountered due to sticking and the building up of a layer of hard sintered material on the hearth. For example, the rabbles may ride so high that the rabble bars tear out the heating elements.

To this end a sealed return chamber 33 is provided, which, in the form of apparatus shown, is placed beneath the reducing chamber and is separated therefrom to provide an opening or air space 34. The return chamber is thus exposed to the air on its top, bottom and sides. The walls of the return chamber are formed of heat conducting metal and heat is dissipated by radiation as well as convection. End bays 35 and 36 are provided for the drive sprocket 22 and tail sprocket 23 respectively, so that the return chamber is sealed and the conveyor mechanism is at all times sealed against the air. Moreover by thus sealing the various chambers it is possible to maintain a positive pressure throughout the apparatus, whether solid reducing agents or gaseous ones are employed, and thereby preventing the inflow of any oxidizing or cooling atmosphere into the apparatus. This is very important in that it prevents the formation of explosive mixtures in the apparatus. The inflow of cool air or other gas also causes precipitation of carbon black where carbon containing reducing agents are employed and would seriously interfere with the efficiency of the reduction.

The arrangement of the parts also results in maintaining a slightly lower, though still positive, pressure in the return chamber. The gates 8, 9 and 29, when opened allow some of the gases to flow out of the reducing chamber into the bays 35 and 36 and thence into the return chamber. There is thus maintained a non-oxidizing positive pressure atmosphere in the return chamber and bays 35 and 36. The gates, however, sufficiently retard the flow of gases to keep the reducing chamber at a higher pressure than the return chamber.

The positioning of the return chamber below the reducing chamber also helps to maintain a lower temperature in the return chamber and incidentally also aids in maintaining a suitable temperature in the reducing chamber, since there is a tendency for the hotter gases to rise. The return chamber could, however, be placed above the reducing chamber, where suitable cooling can be effected and construction problems permit. The excess reducing gases are discharged from the low pressure point 37 in the return chamber.

The amount of cooling should preferably be such that the conveyor elements at no time reach such a temperature that the charge or the reduced material will stick or adhere thereto. In the construction shown no additional cooling means are needed. When carbon containing reducing agents are used it is also preferable to keep the conveyor elements below about 1200° F. to prevent any carburizing action thereon.

A water cooled screw conveyor 38 is provided in the discharge end of the reducing chamber into which the reduced material drops from the hearth. Any other suitable means of conveying reduced material away from the furnace and for cooling it to room temperature out of contact with oxygen to prevent oxidation may be employed. It is desirable to cool the reduced material as rapidly as possible, particularly in the case of iron, and to keep it from the air until it has been sufficiently cooled to prevent reoxidation. To this end the discharge conveyor is exposed to the reducing gases from the furnace.

Any suitable reducing agent may be used. Where solid carbonaceous reducing agents are used they may be mixed with the material to be reduced such as iron oxide. Where reducing gases are used they may be introduced by any suitable means. In the production of sponge iron or iron powder the temperature of the reduction will, of course, be below the melting point of iron and should be below the point at which substantial sintering occurs. The suitable temperature range is from 1400° F. to 1850° F., preferably the higher temperatures.

In Figure III is illustrated another modification of the invention, particularly suitable when employing a gaseous carbonaceous reducing agent. The exhaust furnace heating gases still contain a considerable amount of heat and it is desirable to make use of this heat. To this end the gases from the flues 20 are collected in an exhaust manifold 201, and are then conveyed to a gas generator and heat exchanger 202. In this gas generator, the exhaust gases are employed to preheat a charge of solid carbonaceous material used for the production of reducing gases. The cooled exhaust gases are then discharged by means of conduit 203, and the hot reducing gases are conveyed by means of conduit 204 to the furnace where they are suitably introduced into the furnace for the reduction of the charge therein.

Alternatively the hot furnace heating exhaust gases may be simply used to pre-heat cold reducing gases to be introduced into the furnace by any suitable heat exchange device.

The operation of the furnace in connection with the production of sponge iron from iron oxide mixed with a carbonaceous reducing agent will be described.

The furnace is first heated to the required temperature during which time a reducing atmosphere is maintained in the furnace. During the preliminary heating period the conveying mechanism is operated to prevent overheating any unreduced material present in the furnace from a previous run, being discharged and reworked. The hopper 1 is charged with iron oxide, and where a solid carbonaceous reducing agent is to be used it may conveniently be mixed with the iron oxide charge. Throughout the operation a sufficient amount of material is maintained in the hopper to act as an effective seal to prevent inflow of air into the furnace. When the desired temperature is reached in the furnace the feed 2 is put into operation. Preheating of the charge is effected by radiation to the hopper 1 and in the preheating zone 6 so that by the time the charge is introduced into the reducing chamber proper it is at or near reduction temperatures and before it has progressed very far in the reducing chamber it is substantially at the furnace temperature. The rabbles moving through the furnace agitate the charge upon the hearth and advance it through the reducing chamber. Due to the heat conducting nature of the hearth and the insulating effect of the charge, the hearth is relatively cool and sticking and sintering of the charge on the hearth is prevented.

The number of rabble arms 25 with their associated rabbles 26, the shape (contours) of rabbles and rate of travel of the rabbling means are so regulated so as to properly agitate the charge, to convey it through the furnace in such a time as to complete the reduction, and to prevent overheating of the conveying mechanism. If too many rabbles are used or the rate of travel is too fast the charge will not be properly reduced. If the rate of travel is too slow the conveying mechanism may become overheated and sticking result. Too slow a rate of travel also results in inefficient operation.

The rate of travel and number of rabbles, however, should be kept at the minimum consistent with obtaining complete reduction so as to avoid heat losses due to the conveying and agitating elements carrying heat out of the reducing chamber.

As the charge nears the end of the reducing zone it should be substantially completely reduced, and the reduced charge is pushed from the discharge end of the hearth and is conveyed away from the furnace where it is cooled before being exposed to the air.

The rabbles and their associated supporting elements are cool as they enter the reducing chamber. During their passage through the reducing chamber they pick up heat, but do not attain a sufficiently high temperature to cause sticking, and do not reach as high a temperature as that of the charge. During the return of the rabbling means through the return chamber they and their associated supporting elements give up an appreciable amount of the heat acquired in the reducing chamber, which heat is dissipated from the walls of the return chamber. In addition the conveying mechanism may be cooled with water or by means of jets of inert or reducing gases.

The charge introduced upon the stationary hearth is uniformly advanced longitudinally through the furnaces by the linearly traveling rabbling and conveyor means, and as a result it is maintained at a uniform depth longitudinally of the furnace, except for the swelling of the charge incident to the low temperature reduction. At the same time the rate of travel of each rabble and the rate of advance and the degree of rabbling is uniform throughout the whole charge. Also the charge is maintained stationary except when being rabbled with the result that more uniform heating of the charge is possible. The charge is also of substantial uniform thickness transversely of the furnace, the only irregularities being the furrows formed by the rabbles. There is, however, no piling up or tendency for the charge to pile up at any point in the furnace.

The process causes the reduced material to travel faster than the unreduced material. The temperatures, of course, are nowhere near the melting point of the iron oxide, but they are such that particles of reduced material are softened and agglomeration of the reduced particles occurs. Due to segregation these agglomerates travel faster in the direction of travel of the rabbles than the unreduced material and since this direction of travel is towards the exit the removal of reduced material from the furnace is speeded up.

This process has a number of advantages. In the first place the finished material is not subjected to the longer heating necessary to reduce all of the charge thereby retarding undue sintering. Also any material variations in the thickness of the bed which might occur become non-critical since the reduced material is more rapidly ejected from the furnace thereby exposing the underlying unreduced material to the radiant heat.

Due to the uniform conditions, local overheating, incomplete reduction as a result of local accumulation of the charge, etc., are prevented.

These, together with the provision of means for preventing any sticking to the rabbles and the effects of segregation mentioned above are believed to be the causes for the freedom from mechanical difficulties and for the high purity of the product.

The reduced iron discharged from the furnace is in the form of a mixture of discrete iron particles and agglomerates in the form of a soft iron sponge which can readily be broken up in one's fingers. It contains a small amount of free carbon and generally a small amount of silica if silica is present in the initial charge. After removal of free carbon and non-magnetic material a product consistently containing as much as 98% free iron has been produced by the apparatus described.

By employing an apparatus of the type described, long continuous operation without sticking or mechanical difficulties due to sintering is possible and the form of apparatus shown has been operated continuously for several weeks without encountering mechanical difficulties and with the consistent production of high purity iron powder.

It is to be understood that modifications and variations may be made in the form of apparatus illustrated without departing from the spirit and scope of the invention.

This application is a division of application Serial No. 385,782, filed March 29, 1941.

Having described the invention what is claimed is:

1. The process of producing a metal sponge which comprises maintaining a charge comprising divided metal oxide to be reduced in the form of a bed within a reducing zone, uniformly heating said charge by radiant heat to a temperature sufficient to cause agglomeration of the reduced metallic particles, periodically agitating and advancing said charge toward the point of ejection by means of rabbles travelling in the same direction as the direction of advancement of the charge toward the point of ejection through the reducing zone, and maintaining the charge stationary except when being rabbled.

2. The process of claim 1 in which the metal oxide is iron oxide.

3. The process of producing sponge iron which comprises forming a bed of substantially uniform depth of iron oxide, subjecting said bed of iron oxide to the action of radiant heat in an enclosed heating zone maintained at a temperature of from 1400° F. to 1850° F., bringing reducing gases into contact with said bed while heating at the aforementioned temperature for a sufficient time to effect substantially complete reduction of the iron oxide, intermittently, but at regular periodic intervals, agitating relatively small portions of the bed at a time while simultaneously advancing the same uniform distances through the heating zone toward the point of ejection from the heating zone, the agitating and the advancement of the bed being continuously carried out on successive portions of the bed by means of rabbles travelling in the same direction as the direction of advancement of the charge toward the point of ejection and maintaining all portions of the bed stationary except when they are being agitated.

4. The process of producing sponge iron which comprises forming a bed of substantially uniform depth of an intimate mixture of iron oxide and carbonaceous reducing material, subjecting said bed of material to the action of radiant heat in an enclosed heating zone maintained at a temperature of from 1400° F. to 1850° F. for a sufficient time to effect substantially complete reduction of the iron oxide, intermittently, but at regular periodic intervals, agitating relatively small portions of the bed at a time while simultaneously advancing the same uniform distances through the heating zone toward the point of ejection from the heating zone, the agitating and advancement of the bed being continuously carried out on successive portions of the bed by means of rabbles travelling in the same direction as the direction of advancement of the charge toward the point of ejection and maintaining all portions of the bed stationary, except when they are being agitated.

5 The method of producing iron sponge which comprises forming a bed of divided iron oxide upon a hearth in a reducing zone, maintaining reducing conditions in said zone, heating said bed to a temperature sufficient to cause agglomeration of the reduced metallic particles, periodically agitating successive portions of said bed, and periodically advancing successive portions of said bed by means of rabbles travelling in the same direction with reference to the hearth as the direction of travel of the material through the reducing zone toward the discharge point.

6. In a continuous method for the production of sponge metal from the corresponding metal oxide by a pyro-metallurgical process in which a charge of the oxide is maintained in a reducing zone in the form of a bed and heated to a temperature sufficient to cause agglomeration of the reduced metallic particles, the improvement which comprises advancing a series of rabbles towards the discharge point through said bed to selectively advance the agglomerated sponge metal at a faster rate than unreduced material towards said discharge point.

7. The process of claim 6 in which the metal is iron.

DAVID N. BURRUSS, Jr.
JOSEPH E. DRAPEAU, Jr.